Aug. 8, 1967 C. G. DAVIS ETAL 3,335,222

BINARY DATA RATE RECONSTRUCTION

Filed Dec. 20, 1963

10 Sheets-Sheet 1

INVENTORS: C. G. DAVIS
L. C. THOMAS

BY Leonard M. Arnold

ATTORNEY

Aug. 8, 1967 C. G. DAVIS ETAL 3,335,222

BINARY DATA RATE RECONSTRUCTION

Filed Dec. 20, 1963 10 Sheets-Sheet 2

Aug. 8, 1967

C. G. DAVIS ET AL 3,335,222

BINARY DATA RATE RECONSTRUCTION

Filed Dec. 20, 1963

10 Sheets-Sheet 4

Aug. 8, 1967 C. G. DAVIS ETAL 3,335,222

BINARY DATA RATE RECONSTRUCTION

Filed Dec. 20, 1963 10 Sheets-Sheet 7

Aug. 8, 1967 C. G. DAVIS ETAL 3,335,222

BINARY DATA RATE RECONSTRUCTION

Filed Dec. 20, 1963

10 Sheets-Sheet 8

United States Patent Office
3,335,222
Patented Aug. 8, 1967

3,335,222
BINARY DATA RATE RECONSTRUCTION
Claude G. Davis, Colts Neck, and Lewis C. Thomas, North Plainfield, N.J., assignors to Bell Telephone Laboratories, Incorporated, New York, N.Y., a corporation of New York
Filed Dec. 20, 1963, Ser. No. 332,152
4 Claims. (Cl. 178—50)

ABSTRACT OF THE DISCLOSURE

A data transmission system for transmitting data over a channel of a regenerative pulse transmission system. The data is first stored until the occurrence of the channel allocated for its transmission. Information regarding the interval of time each data character is stored prior to transmission is obtained and transmitted over a second channel to one receiving terminal where it is used to reconstruct the data and the instantaneous rate at which the data occurred.

This invention relates to data transmission and more particularly to the transmission of binary data over a pulse transmission system.

The pulse transmission system described in the January 1962 issue of the Bell System Technical Journal by C. G. Davis in "An Experimental Pulse Code Modulation System for Short Haul Trunks" pages 1–24 and by J. S. Mayo in "A Bipolar Repeater for Pulse Code Modulation Signals" pages 25–97 appears to be ideally suited for the transmission of data from one source, such as a data tape, to a distant store or utilization device; since it already transmits information in digital form. Such transmission is not easily accomplished in an economical manner, however, due to the great difference in the information carrying capacity of the transmission system and the speed of the data tape.

The pulse transmission system described in the above-mentioned articles in the Bell System Technical Journal provides for the transmission of twenty-four channels of information. The signals present in each channel are sampled in a recurring sequence, and one sample from each channel or twenty-four samples are encoded and transmitted every 125 microseconds. Each sample is encoded into a digital signal occupying seven time slots with an additional time slot allocated for signaling information. Since each encoded sample including any signaling information occupies eight time slots the twenty-four channels require a total of one hundred ninety-two time slots for transmission over the system. An additional or one hundred ninety-third time slot is added to permit synchronizing or framing the transmitter and receiver of the system, and these one hundred ninety-three time slots comprise a framing period. There are eight thousand such periods, or frames, each second, and the repetition rate of pulses on the transmission system is 1.544 million pulses per second. Since one time slot in each channel is usually allocated for signaling, each channel of the pulse transmission system is capable of transmitting 56 kilobits per second, which capacity is generally enough to handle data from a single commercial data tape source.

Commercially available data equipment uses a data tape which employs seven tracks of information so that seven bits appearing in parallel across the data tape comprise a data character. The speed of the tape is quoted in terms of characters per second, and the maximum speed presently obtainable with commercially available equipment is approximately 62.5 kilocharacters per second. Most commercial data tape machines, however, operate at considerably slower speeds and can be accommodated by the 56 kilobit per second rate of a single channel of the above-described pulse transmission system.

Thus it is desirable that data from a single data source be transmitted over a single channel of the pulse transmission system with those channels of the system not used for the transmission of data being made available for voice transmission by subscribers or the transmission of data from other data sources.

It is an object of this invention, therefore, to transmit binary data from a source, such as a data tape to a utilization device over one or more of the channels of the regenerative pulse transmission system with the remaining channels of the system being employed for the transmission of voice signals from subscribers or data from other sources.

Generally speaking, it is the responsibility of the communications carrier to reproduce at the receiving subscriber as closely as possible the signal transmitted by the transmitting subscriber. Allocating the data from a data source to a specific channel of the pulse transmission system would fail to meet this requirement. For example, the mere storage of a data character until the occurrence of the preselected channel in which it is to be transmitted followed by transmission over that channel would lend an artificial regularity to the spacing of the data characters as received since the data characters would be spaced apart in time by 125 microseconds when a data character was transmitted in each data channel. In fact, however, the spacing of the data characters may vary greatly as they are applied to the transmission system and since it is not inconceivable that some additional information might be contained in the very spacing of the data characters it would be the responsibility of the communications carrier to reproduce the instantaneous data rate as accurately as possible.

It is an object of this invention, therefore, to not only transmit binary data over one or more channels of the regenerative pulse transmission system but also to reproduce at the receiving terminal the data at the original instantaneous data rate at which it was applied to the transmitting terminal.

In accordance with this invention binary data from a data source such as a data tape is transmitted over a channel of the regenerative pulse transmission system by storing a data character until the occurrence of the channel allocated for the transmission of data, transmitting the data character at the pulse repetition frequency of the transmission system in the data channel, measuring the interval of time between the time the data character is stored and the time at which it is transmitted, and transmitting over a second channel this data rate information to the receiving terminal, where it is used to reconstruct the data and the instantaneous rate at which the data occurred. In this manner data may be transmitted from a data source over one channel of the pulse transmission system, with the remaining channels, save the one utilized for transmitting the rate information, being utilized for the transmission of voice signals from the data subscriber or voice transmission from other subscribers. In addition, the instantaneous data rate at which the sending subscriber applied data characters to the transmission system is closely reproduced at the receiver.

This invention will be more fully comprehended from the following detailed description taken in conjunction with the drawings in which:

FIGS. 1A, 1B and 1C are placed side by side with FIG. 1A on the left, FIG. 1B in the center, and FIG. 1C on the right;

FIGS. 3A, 3B and 3C are placed side by side with FIG. 3A on the left, FIG. 3B in the center, and 3C on the right;

Figure 1A:
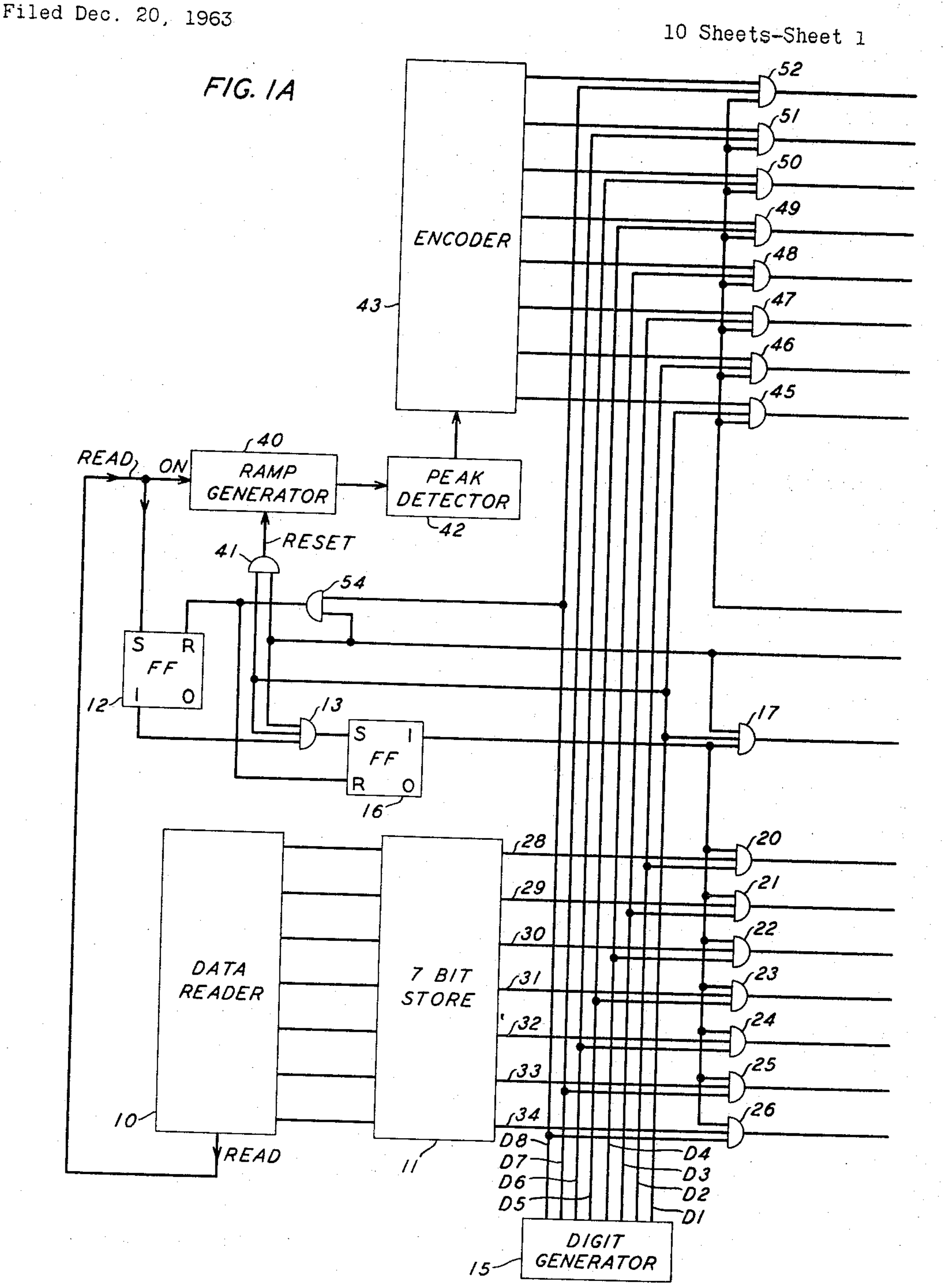
FIGS. 1A, 1B and 1C represent a composite block diagram of a data transmission system embodying this invention when
Figure 1B:
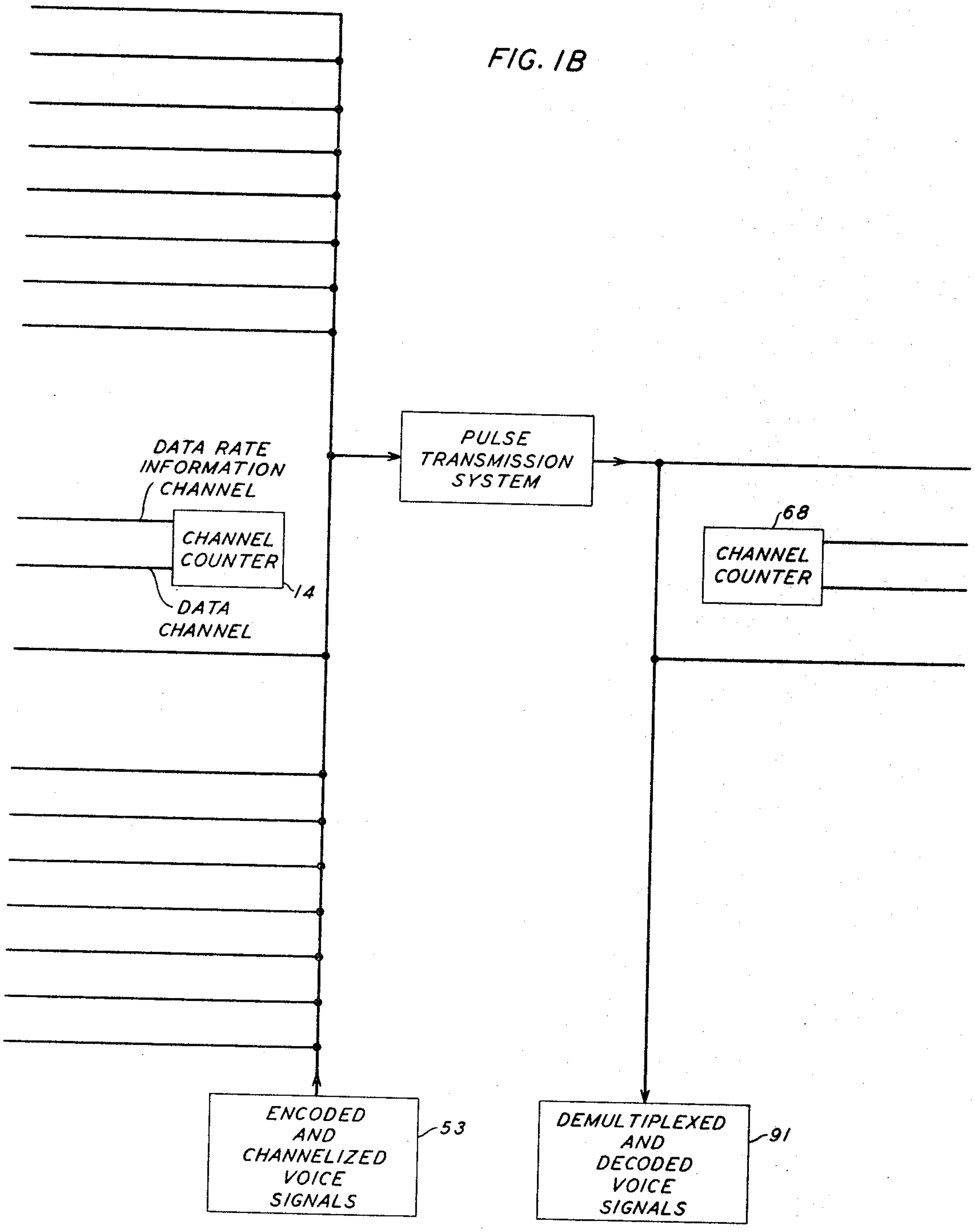
Figure 1C:
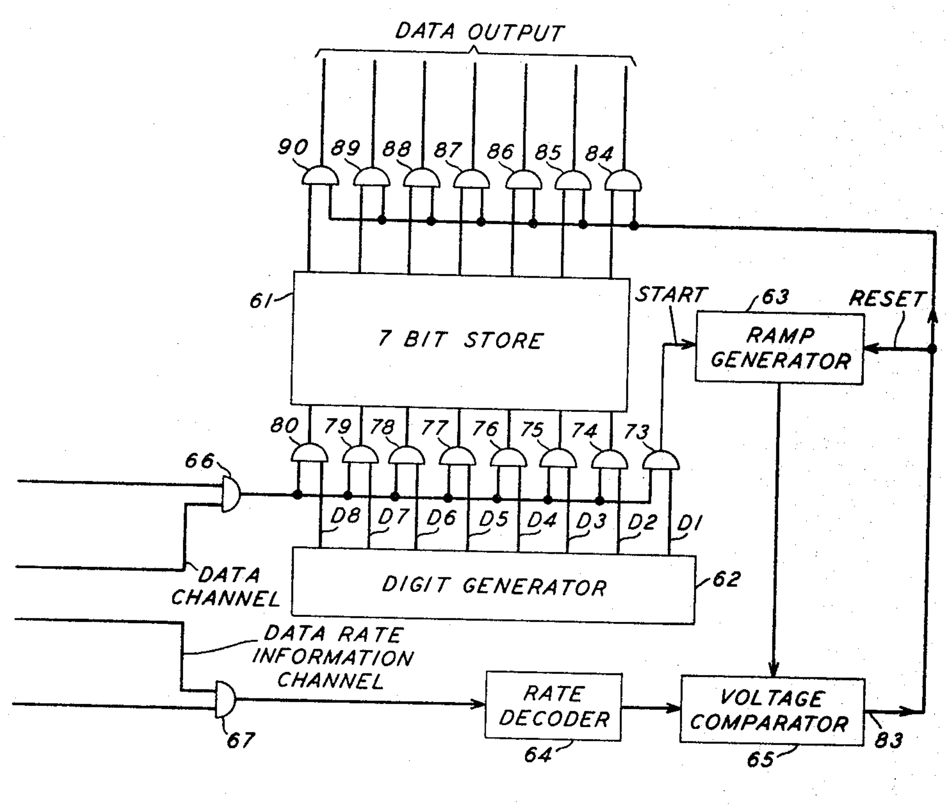

In the embodiment of the invention shown in FIGS. 1A, 1B and 1C a data character is read from a data tape and stored until the occurrence of the next data channel, i.e., the channel allocated for the transmission of data, whereupon the data character is read out in the second through eighth time slots of the data channel, with a mark inserted in the first time slot of the data channel to indicate that a data character is to follow. To accomplish such timely readout and signaling, use is made of the digit generator and channel counter found at each terminal of the pulse transmission system described in the above-mentioned articles. The channel counter at the transmitting terminal is used to multiplex seven-bit parallel characters onto the twenty-four channels and for this purpose counts to twenty-four eight thousand times each second producing twenty-four control pulses which sequentially appear on each of its output terminals for each such count. Each output terminal is associated with a particular channel so that encoded samples to be transmitted in a particular channel are transmitted only upon the occurrence of a pulse at the output terminal of the counter associated with that channel. In conjunction with the channel counter a digit pulse generator is employed to insert the encoded voice signals and any signaling into the eight time slots which make up a channel. For this purpose the digit generator generates eight pulses which sequentially appear on each of eight output terminals D1 through D8 during the eight time slots of each channel in each frame. During the occurrence of the data channel following the storage of a data character, the output of the channel counter and the output pulses from the digit generator combine to insert a mark in the first time slot of the data channel and the stored data character in the second through eighth time slots.

In the embodiment of the invention shown in FIGS. 1A, 1B and 1C upon the storage of the data character a linear voltage versus time generator or as it is commonly known in the art, ramp generator, is actuated to generate a voltage which rises until the generator is turned off upon the occurrence of the data channel. The peak voltage attained by the generator is then measured and its value encoded and transmitted during the eight time slots of the channel which follows the data channel under the control of the digit pulse generator and the channel counter.

At the receiver, the data channel and the data rate information channel are separated under the control of the channel counter and the data character stored. The analog voltage representing the time duration between the storage and transmission of the character at the transmitting terminal is obtained by decoding he digit signals received in the data rate information channel. Simultaneously with the arrival of the data a ramp generator having a slope which is the negative of that of the ramp generator at the transmitter is started and when the decoded analog voltage and the voltage output of the ramp generator are equal the data character is read out of the store. The resulting data characters which are reproduced at the receiver have substantially the same instantaneous data rate as the signal applied to the transmitter, and differ only in that they are delayed by one frame or 125 microseconds.

More specifically, with reference to FIGS. 1A and 1B data are read from a data tape by a data tape reader 10 which has seven output terminals at which appear the seven bits of data which make up a data character. These seven parallel bits of data are in turn applied to a seven-bit store 11 and when the data have been so applied the reader 10 generates a read signal which is applied to set a bistable circuit 12. As is frequently done by these skilled in the art, all bistable circuits will be conveniently shown in block diagram form with four terminals S, R, 1 and 0. A signal applied to the S terminal is understood to mean that the bistable device will then be "set" producing a reference voltage at the 1 terminal and a ground voltage at the 0 terminal. Conversely, a signal applied to the R terminal produces a reference voltage at the 0 terminal and a ground voltage at the 1 terminal and the bistable device is then said to be reset.

The read signal sets bistable circuit 12 whose 1 output terminal is connected to one input terminal of a three input terminal AND gate 13. The other two input terminals of the AND gate are connected to the data channel output terminal of the channel counter 14 and the D1 output terminal of the digit generator 15 respectively so that when a data character has already been stored the occurrence of the first time slot of the next occurring data channel produces an output pulse from AND gate 13 whose output terminal is connected to set bistable circuit 16 and produce a reference voltage at its 1 output terminal.

The function of the voltage so generated at the 1 output terminal of bistable circuit 16 is to generate a mark in the first time slot of the data channel to indicate to the receiver that a data character will be transmitted in the data channel of that frame and also to enable circuitry which serially transmits the data character. To accomplish the former purpose the 1 output terminal is connected to one input terminal of a three input terminal AND gate 17, whose other two input terminals are connected to the data channel output terminal of the channel counter 14 and the D1 output terminal of digit generator 15. As a result, during the first time slot of the data channel the gate 17 generates a reference voltage at its output terminal which is directly applied to the pulse transmission system and a mark is transmitted indicating that a data character is to follow.

The 1 output terminal of bistable circuit 16 is also connected to one input terminal of each of seven transmission gates 20 through 26 to prepare these gates to conduct during the second through eighth time slots. A second input terminal of each transmission gate 20 through 26, respectively, is connected to one output terminal 28 through 34, respectively, of store 11 while the third input terminal of each gate is connected to one of the output terminals D2 through D8, respectively, of digit generator 15. Each transmission gate 20 through 26 is then sequentially actuated during the second through eighth time slots of the data channel so that the data character stored in store 11 is applied to the transmission line during these time slots.

Thus the data received from a data tape at an instantaneous rate less than 1 character per 125 microseconds or one character per frame is transmitted on a single channel of the transmission system. As a result of storing a data character until the occurrence of the next data channel and then transmitting the data in that channel, the data will be received at the receiving terminal at regular intervals and the only lapse in such regular reception of data characters will occur when no data character has been stored in the interval between the occurrence of data channels. In line *a* of FIG. 2 the occurrence of a data character at the output of reader 10 is indicated by a vertical line while in line *b* of FIG. 2 the occurrence of a data channel is indicated by a vertical line. Since the data character is stored until the occurrence of a data channel the data will be inserted in the data channels as indicated by the arrows between lines *a* and *b* of FIG. 2. As may be seen delays, $\Delta_1$, $\Delta_2$, $\Delta_3$ . . . exist between the time that each data character is stored and the occurrence of the next data channel. In accordance with this invention this delay is measured and this information is transmitted to the receiving terminal on a separate channel, which may be designated the data rate information channel, where appropriate delays are created so that the instantaneous data rate is reconstructed at the receiving terminal.

To measure the delay between the storage of a data character and its transmission over a data channel a linear voltage generator 40, or ramp generator as it is more commonly called, is employed in the embodiment of the invention shown in FIGS. 1A, 1B and 1C. The ramp generator 40 generates a voltage which rises linearly with respect to time, from a predetermined base voltage, after the storage of the data character. When the data character is transmitted the generator 40 is turned off and the maximum voltage attained is measured. The peak amplitudes $V_1$, $V_2$, $V_3$ . . . , shown in line *c* of FIG. 2, of the voltages generated between the storage and transmission of data characters are then a direct measure of the delays between the storage and transmission of each data character. These peak amplitudes are encoded and transmitted to the receiving terminal over the data rate information channel, which is usually the next occurring channel in a frame after the data channel.

To generate the analog voltages, $V_1$, $V_2$, $V_3$ . . . representing the respective delays $\Delta_1$, $\Delta_2$, $\Delta_3$ . . . the ramp generator 40 is turned on by the read signal from reader 10 and turned off by the output signal from an AND gate 41 upon the occurrence of the first time slot of the data channel. The AND gate 41 is a two input terminal AND gate, one input terminal being connected to receive the signal on the data channel output terminal of counter 14 and the second connected to the D1 output terminal of generator 15. The peak amplitude attained by generator 40 is detected by peak detector 42 whose output is encoded by an eight digit encoder 43. Encoder 43 has eight output terminals each of which is connected to an input of a respective one of eight transmission gates 45 through 52. The transmission gates 45 through 52 are arranged to conduct during the eight time slots of the data rate information channel. To do this a second input terminal of each transmission gate is connected to the data rate information channel output terminal of counter 14 while a second terminal of each gate 45 through 52 is connected to a respective one of the D1 through D8 output terminals of generator 15. As a result gates 45 through 52 sequentially conduct during the eight time slots of the data information channel and transmit to the receiving terminal encoded representations of the delays $\Delta_1$, $\Delta_2$, $\Delta_3$ . . .

Upon the termination of the data channel bistable circuits 12 and 16 are reset by the output signal from two input terminal AND gate 54 one of whose input terminals is connected to the data channel output terminal of counter 14 and the other to the D8 output terminal of generator 15. Transmission gates 17 and 20 through 26 are thus disabled since the voltage at the 1 output terminal of bistable circuit 16 is now at ground potential.

The voice signals are encoded and transmitted over the proper channels by means of the techniques described for such transmission in the above-mentioned articles in the Bell System Technical Journal. This process of encoding and preparing the voice signals for transmission is indicated in block diagram form in FIG. 1B by the circuitry 53 designated by the nomenclature "Encoded and Channelized Voice Signals."

The encoded voice signals present on the twenty-two of the twenty-four channels of the pulse transmission system and the data signals and data rate information are transmitted over the transmission system shown in block diagram form in FIG. 1B. At the receiver shown in FIGS. 1B and 1C the data channel and the data rate information channel are separated from the transmitted signal and each data character is inserted into a seven-bit store 61. The arrival of the mark in the first time slot of the data channel, is used together with the D1 output of a digit generator 62, found at the receiving terminal to start a ramp generator 63, whose output voltage has a slope which is the negative of the voltage generated by ramp generator 40 and a base voltage equal to the voltage which generator 40 would have attained if turned on for one frame or 125 microseconds. The data rate information is applied to a decoder 64 and when the output voltage of the ramp generator 63 is equal to the analog voltage representing the decoded rate information a voltage comparator 65 causes the data to be read out of store 61. As indicated in line *e* of FIG. 2 each data character (indicated by a solid vertical line) is read out of the store $\Delta_1$, $\Delta_2$, $\Delta_3$ . . . time units before the occurrence of the next data channel indicated by a dotted vertical line in FIG. 2. The time units $\Delta_1$, $\Delta_2$, $\Delta_3$ . . . shown in line *e* of FIG. 2 correspond to those shown in line *b* of FIG. 2 so that the data characters are read out of the store at the same instantaneous rate at which they were received at the receiving terminal, but are delayed by 125 microseconds, the period of a frame.

More specifically, the receiving apparatus shown in FIGS. 1B and 1C functions in the following manner. Transmission gates 66 and 67 separate the data channel and the data information channel from the transmitted signal. A channel counter 68 is present at each receiving terminal of the transmission system and the data channel output terminal of the counter 68 is connected to one input terminal of the two input terminal transmission gate 66. Similarly, the data rate information channel output terminal of counter 68 is connected to one input terminal of a two input terminal transmission gate 67.

The transmitted signal is applied to the second input terminal of transmission gate 66 so that during the reception of a data channel the data character present in the data channel appears during the second through eighth time slots of the channel at the output terminal of gate 66. To the output terminal of gate 66 are connected one input terminal of each of a series of two input terminal transmission gates 73 through 80. The second input terminal of each gate 73 through 80, respectively, is connected to a respective one of output terminals D1 through D8, of digit generator 62 forming part of the receiving terminal of the pulse transmission system. Since each gate 74 through 80 is sequentially enabled during the second through eighth time slots of the data channel the data character is read into the seven-bit store 61, connected to receive the outputs of gates 74 through 80, where it is stored until read out in accordance with the information contained in the information channel. In addition, the mark in the first time slot of a data channel containing a data character is transmitted by transmission gate 73 to ramp generator 63 during the first time slot of the data channel and this mark is used to turn on the ramp generator 63 which generates a voltage which varies linearly with time and has a slope which is the negative of the slope generated by ramp generator 40 at the transmitter. The output voltage generated by generator 63 has an initial or base voltage which is equal to that voltage which generator 40 would generate if turned on for 125 microseconds, the time of a frame, and the output signals generated by generator 63 are shown in line *d* of FIG. 2.

The transmitted signal is also applied to one input terminal of transmission gate 67 which is enabled during the reception of each data rate information channel by the output signal present at the data rate information channel output terminal of counter 68. The output signal from transmission gate 67 therefore is the encoded data rate information which is decoded by decoder 64.

Figure 2:
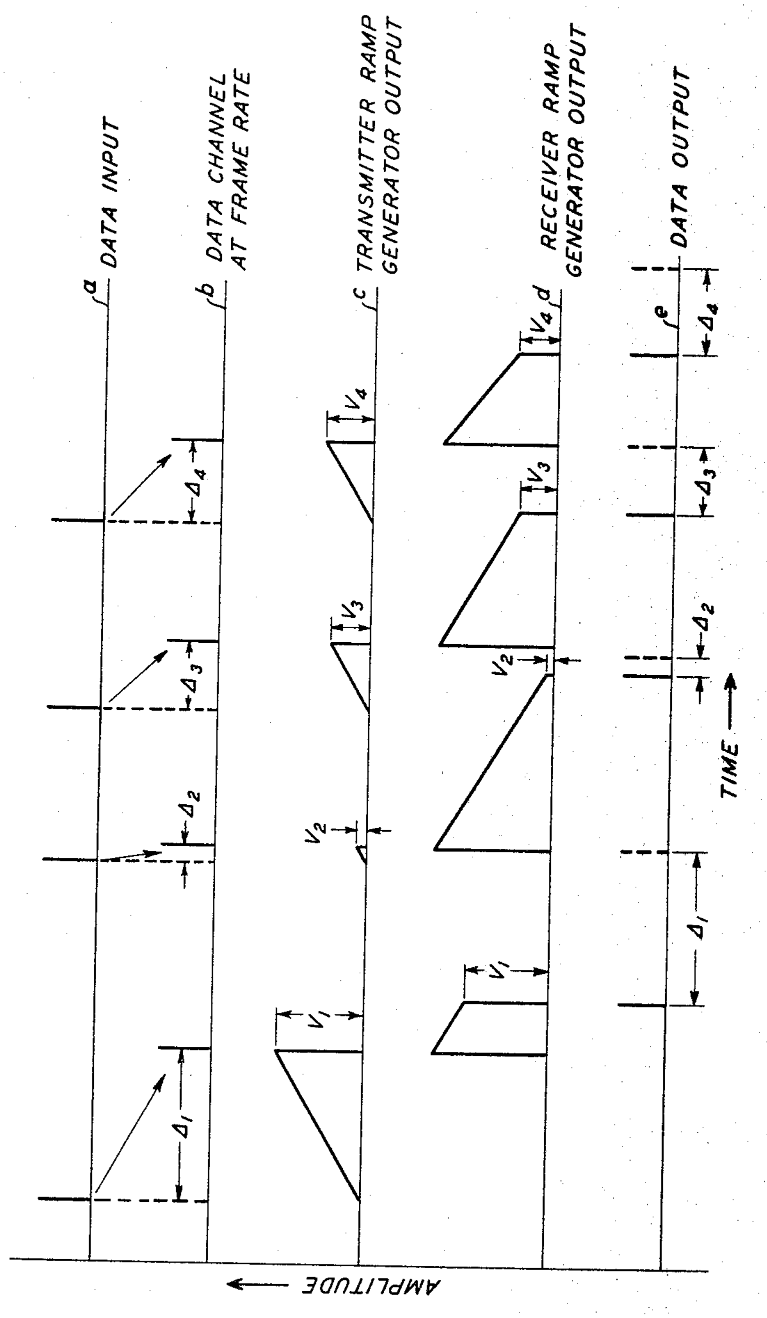
FIG. 2 is a series of waveforms showing signals found in various portions of the circuitry shown in FIGS. 1A and 1C.

The output signals from decoder 64 are the analog voltages $V_1$, $V_2$, $V_3$ . . . shown in line *c* of FIG. 2, and represent the time between the storage of data in store 11 and the occurrence of the next data channel. In accordance with this invention each analog output voltage from decoder 64 is compared with the output voltage of ramp generator 63 by comparator 65 and when these two voltages are equal the voltage comparator 65 generates an output signal at output terminal 83 which enables seven transmission gates 84 through 90 and resets generator 63. Each of the seven output terminals of seven-bit store 61 are connected to a respective one of gates 84 through 90 so that the enabling of these transmission gates reads the data character out of the store.

Since the data character is read out of store 61 when ramp generator 63 produces an output voltage equal to that generated by generator 40, and since generator 63 starts at a base voltage equal to that peak voltage which generator 40 would attain if turned on for a period of time of 125 microseconds a total delay of 125 microseconds is introduced between storage in store 11 and readout from store 61. In accordance with this invention, therefore, the time intervals $\Delta_1$, $\Delta_2$, $\Delta_3$ . . . shown in line *b* of FIG. 2 are reproduced, and the instantaneous data rate is reproduced at the receiver except when the data has been stored at the receiver for a time interval greater than 115 microseconds. In that event the data would have to be read out of store 61 within 10 microseconds after storage which is not possible since the data rate information present in the channel following the data channel would not yet have been decoded. As a result the shortest period of storage that can be attained is 10 microseconds (the time between the first time slot of the data channel and the last time slot of the data information channel) and in the event the data should have been read out earlier a small error is introduced. For delays $\Delta_1$, $\Delta_2$, $\Delta_3$ . . . less than 115 microseconds no error in the instantaneous data rate is introduced.

The voice signals transmitted in all the channels except the data channel and the data rate information channel are demultiplexed and decoded in accordance with the techniques described in the above-mentioned articles in the January 1962 issue of the Bell System Technical Journal. This process of demultiplexing and decoding the voice signals is indicated in block diagram form by apparatus 91 labeled "Demultiplexed and Decoded Voice Signals."

Figure 5:
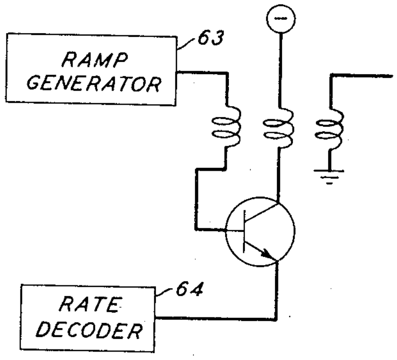
FIG. 5 is a schematic diagram of the voltage comparator shown in FIG. 1C.

All the apparatus shown in FIGS. 1A, 1B and 1C with the possible exception of the data reader 10 and voltage comparator 65 are well known in the art. The data reader may be that described in International Business Machines Customer Engineering Reference Manual, Tape Adapter Unit, January 1961, copyright 1961, by International Business Machines Corporation. The voltage comparator 65 is shown in FIG. 5 and is a simple transistorized blocking oscillator with the output voltage from the rate decoder 64 serving as the emitter bias of the transistor, and the output voltage from ramp generator 63 being fed to the base of the blocking oscillator. Thus where the voltage output of generator 63 is equal to the decoded signal from decoder 64 the blocking oscillator conducts and produces an output signal to reset ramp generator 63 and enable transmission gates 84 through 90.

In accordance with this invention data may be transmitted in more than one channel of the transmitted signal by duplicating the apparatus shown in FIGS. 1A, 1B and 1C so that up to twelve channels of data, from one or more data sources, may be transmitted with the remaining twelve channels containing the data rate information necessary for reproducing at the receiving terminal the instantaneous rate of occurrence of the data.

Figure 3A:
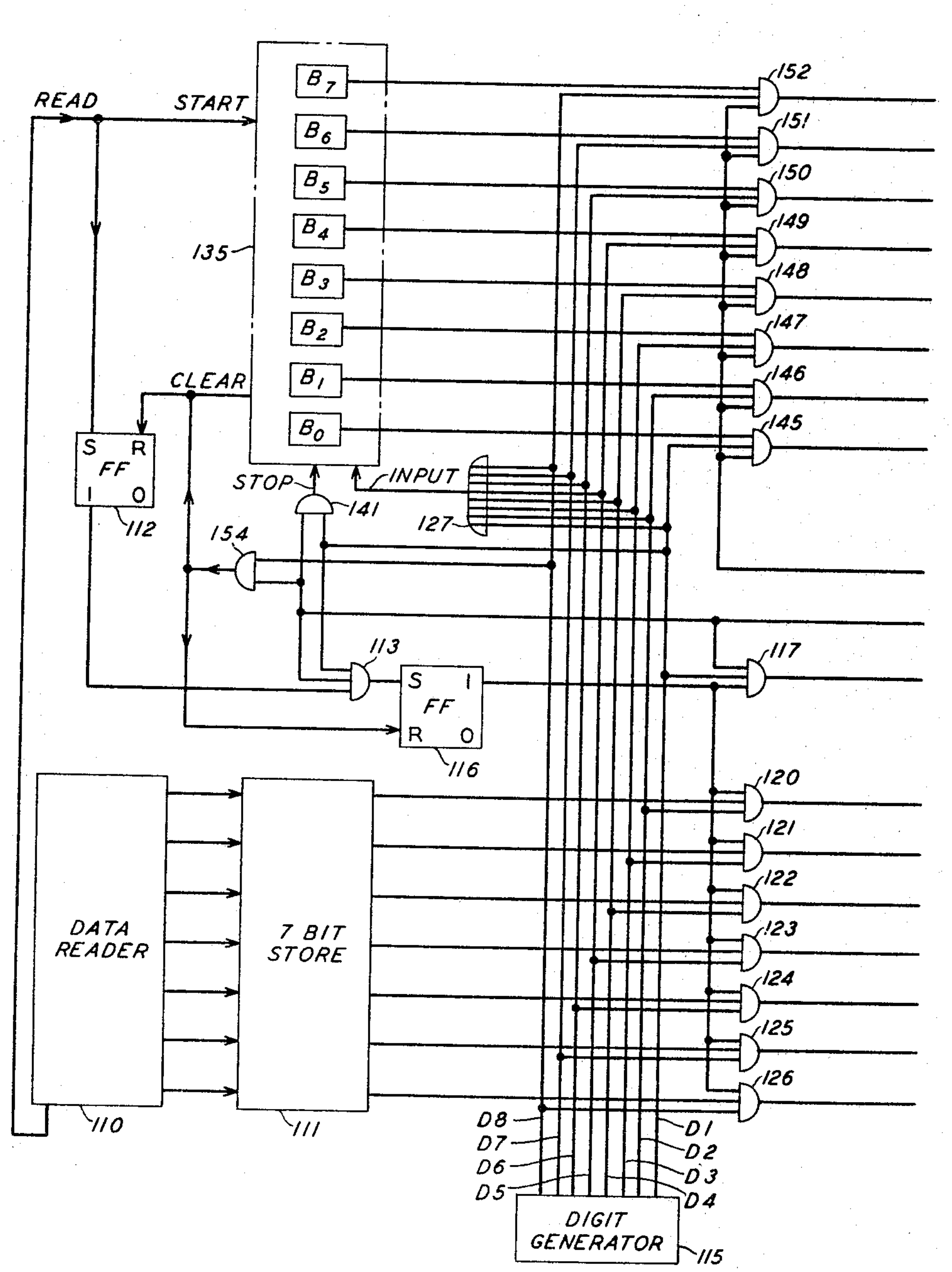
FIGS. 3A, 3B and 3C represent a composite block diagram of a second data transmission system embodying this invention when
Figure 3B:
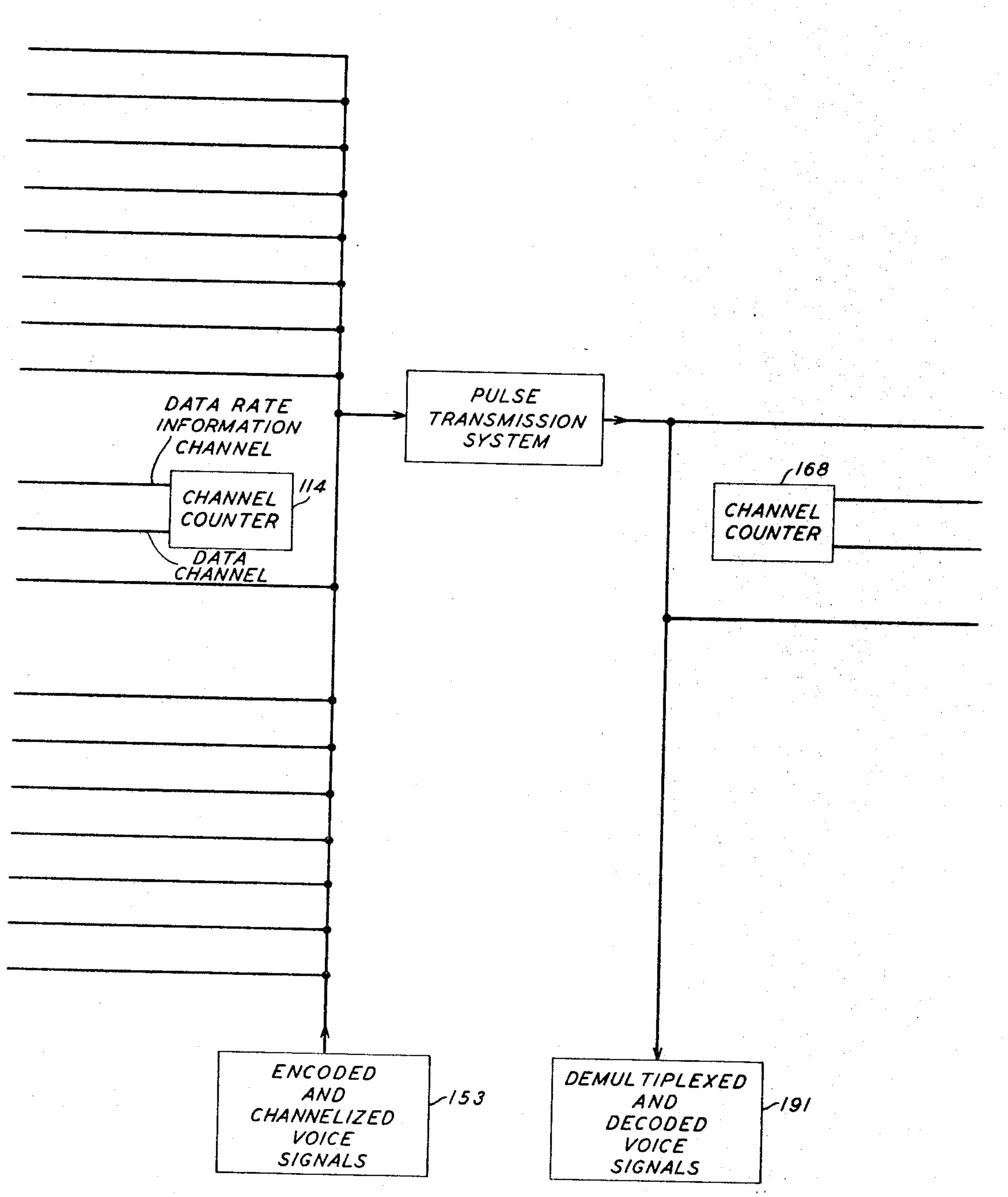
Figure 3C:
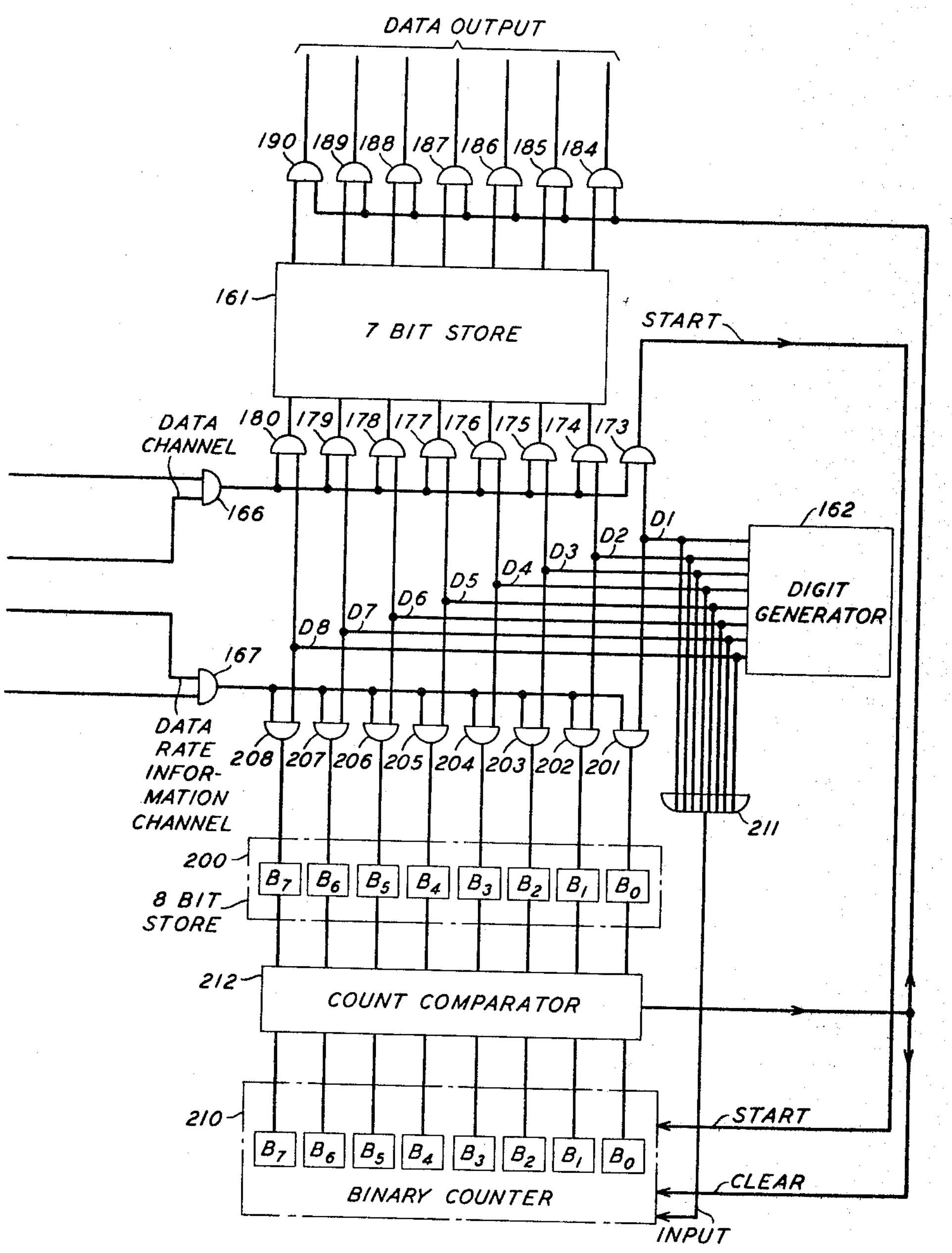

A second data transmission system embodying this invention is shown in FIGS. 3A, 3B and 3C, placed side by side with FIG. 3A on the left, FIG. 3B in the center, and FIG. 3C on the right. In this embodiment of the invention data characters are read from the data tape by reader 110, stored in store 111, and transmitted in serial fashion in the data channel over the transmission system by apparatus which is identical with that employed in the transmitting terminal of the embodiment of the invention shown in FIGS. 1A and 1B. That is, the data are read out of the store 111 under the control of the read signal, the digit generator 115 output signals, channel counter 114 output signals, by means of apparatus comprising bistable circuits 112, 116, transmission gates 120 through 126, and AND gates 154 and 113 in exactly the same manner, as described above, that the data were read out of store 11 under the control of the read signal, digit generator 15, channel counter 14, and the apparatus comprising bistable circuits 12, 16, transmission gates 20 through 26, and AND gates 54 and 13.

Similarly, a mark is transmitted in the first time slot of each data channel when a data character is to be transmitted in that channel under the control of the read signal, bistable circuits 112 and 116, and gate 117 in the same manner as the mark was inserted in the first time slot of such a data channel of the embodiment of the invention shown in FIGS. 1A, 1B and 1C by bistable circuits 12, 16, and gate 17. Throughout FIGS. 3A, 3B and 3C apparatus which is the same both functionally and structurally as that employed in FIGS. 1A, 1B and 1C will have a reference numeral one hundred numbers higher than the corresponding apparatus in FIGS. 1A, 1B and 1C.

At the receiving terminal the data channel is separated from the transmitted signal under the control of channel counter 168, and transmission gate 166, and each data character is inserted into a seven-bit store 161 under the control of digit generator 162 which sequentially enables transmission gates 173 through 180. The operation of this circuitry at the receiving terminal is the same as the circuitry described in connection with the embodiment of the invention shown in FIGS. 1A, 1B, and 1C.

In the transmitting terminal of the embodiment of the invention shown in FIGS. 3A, 3B and 3C the data rate information is derived and transmitted to the receiver in a manner which makes use of the digit pulses available at each transmitting terminal of the pulse transmission system. An eight-bit binary counter 135 is used to count the digit pulses generated by digit generator 115 between the storage of a data character in store 111 and the occurrence of the next data channel. The resulting counts *u*, *v*, *w*, *z* are illustrated in pictorial fashion in line *c* of FIG. 4 and each count represents the number of digit pulses counted in the time intervals $\Delta_1$, $\Delta_2$, $\Delta_3$, $\Delta_4$ . . . between the storage of a data character, indicated by a vertical line in line *a* of FIG. 4 and the first time slot of the next data channel, indicated by a vertical line in line *b* of FIG. 4. The output or count of the eight-bit binary counter is then transmitted to the receiving terminal in serial fashion in the data rate information channel. At the receiver another counter begins counting backward from 193, the number digit pulses in a frame, toward zero, and this counting continues until the resulting count is equal to the count received from the transmitting terminal in the data rate information channel. When the two counts are equal the received data character is read out of the store.

Figure 4:
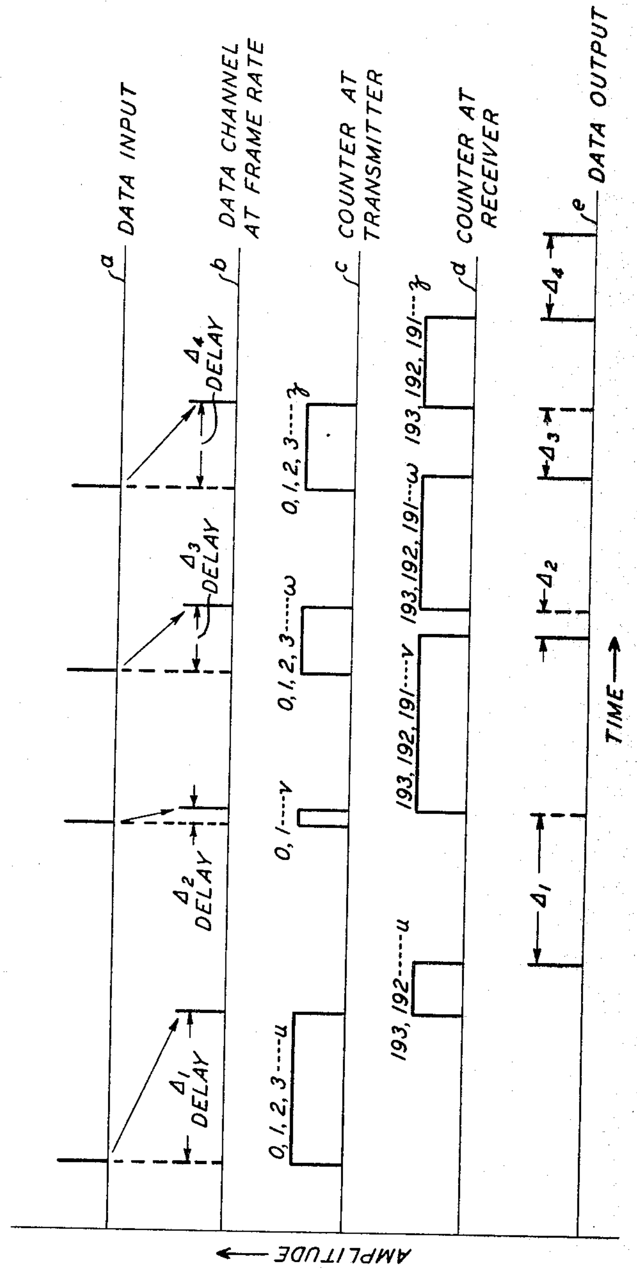
FIG. 4 is a series of waveforms showing signals found in various portions of the circuitry shown in FIGS. 3A and 3C.

The output of the counter at the receiving terminal is shown in line *d* of FIG. 4 and the readout of the data character is indicated by the solid vertical line in line *e* of FIG. 4. As is seen in line *e* of FIG. 4 the data characters are read out of the store $\Delta_1$, $\Delta_2$, $\Delta_3$, $\Delta_4$ . . . time units, respectively, before the occuurence of the next data channel due to the fact that each data character is delayed one frame from the time of storage at the transmitting terminal. In accordance with this invention, therefore, data are transmitted in a predetermined channel of the transmission system, and the instantaneous data rates are reproduced.

More specifically, the digit pulse output terminals, D1 through D8, of digit generator 115 are connected through OR gate 127 to the input terminal of eight-digit binary counter 135. Upon the generation of a read signal by data reader 110 counter 135 starts to count these digit pulses and the counting continues until the occurrence of the first time slot of the data channel whereupon AND gate 141 generates an output signal to stop the counter. The number of digit pulses counted in such a time interval is represented by the states of the binary circuits in the counter 135 which are in turn represented by the signals present at the eight output terminals of the counter. Each of the counter output terminals is connected to one input terminal of a respective one of the three input terminal transmission gates 145–152. These gates are sequentially enabled during the eight time slots of the data rate information channel under the control of the digit generator 115 and channel counter 114 in the same manner as were transmission gates 45–52 in FIG. 1A whose operation is described above. Thus in accordance with this invention the information as to the instantaneous data rate is measured and transmitted over the pulse transmitted system. After the occurrence of the eighth time slot of the data channel AND gate 154 is actuated and its output signal clears the eight-bit binary counter.

At the receiver the data rate information is separated from the rest of the transmitted signal by transmission gate 167 which receives the transmitted signal and is enabled during the reception of the data rate information channel by the data rate information channel output terminal of channel counter 168. The output of the transmission gate is applied to one input terminal of each of a series of transmission gates 201 through 208 which are sequentially enabled during the eight time slots, respectively, of the data rate information channel so that each binary number representing the time between storage of the data character at the receiver at the occurrence of the next data channel is stored in store 200 whose eight input terminals are connected to receive the outputs of transmission gates 201 through 208.

Thus in accordance with this invention data rate information in the form of a binary number representing the number of digit pulses between storage of a character and its transmission is transmitted to the receiver where it is used to reconstruct the instantaneous data rate. At the receiver a binary counter is connected to count digit pulses upon the arrival of the first time slot of the data channel. To accomplish this, transmission gate 173 is enabled during the first time slot of the data channel by the digit pulse on generator output terminal D1 and thus transmits the mark, transmitted in the first time slot of a data channel containing a character, to the start terminal of the counter 210. The digit pulses are applied to the input terminal of the counter 210 by OR gate 211 each of whose eight input terminals are connected to a respective one of the output terminals of the digit generator 162, and whose output terminal is connected to the input terminal of counter 210. Counter 210 is preset to binary number 193 and arranged to count backwards toward zero. When the count, as represented by the state of each binary, is equal to the count stored in store 200, count comparator 212, which is connected to receive both the count in store 200 and that of counter 210, generates an output pulse which enables transmission gates 184 through 190 and the data character is transmitted to the output terminals. In addition, the output of the count comparator clears binary counter 210 to prepare it to count down to the binary number received in the next data rate information channel.

Since the number counted down to by counter 210 is equal to the number of digit pulses counted by counter 135 between the storage and transmission of a data character each data character appears at the data output terminals of the receiving terminal the same number of digit pulses before the reception of a data channel as the data character was stored prior to transmission. Thus in accordance with this invention the instantaneous data rate is reproduced at the receiver with the data from a single a single data source transmitted in a single channel. Again, as is the case in the embodiment shown in FIGS. 1A, 1B and 1C, the only error in reproducing the data rate occurs when the data character was stored more than 115 microseconds before transmission in which case the character should be read out of store 161 at the receiver prior to the arrival of the information in the data rate information channel. Such a data character will be read out of store 161, 115 microseconds before the reception of the next data channel. The resulting error is very small.

The apparatus shown in FIGS. 3A, 3B and 3C, with the possible exception of counter 210 which counts backwards from a preset number, and count comparator 212 are well known in the art. The preset counter 210 which counts backwards may be that described by K. H. Barney in "The Binary Quantizer," Electronic Engineering, vol. 68, pages 962–967, November 1949.

Figure 6:
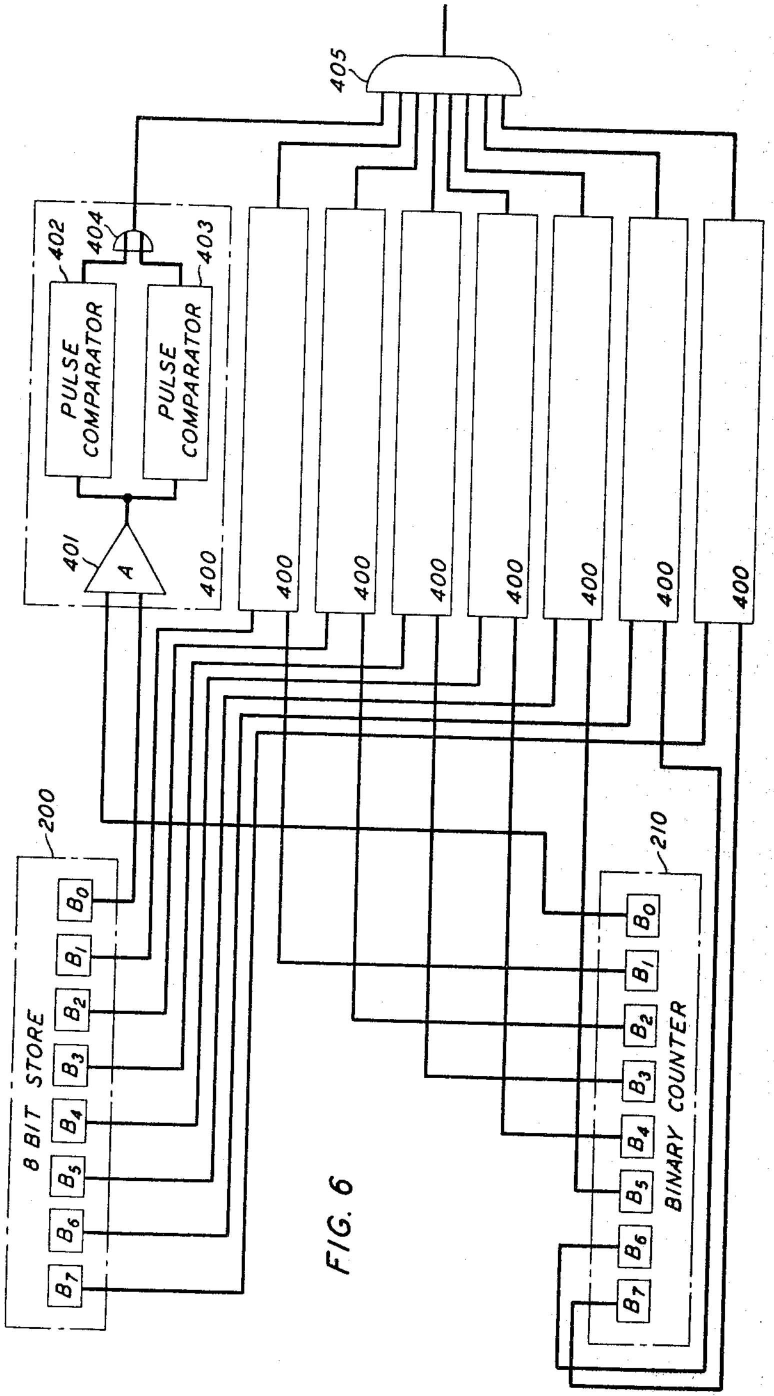
FIG. 6 is a block diagram of the count comparator shown in FIG. 3C.

The count comparator 212 is shown in block diagram form in FIG. 6. Only one stage 400 of the count comparator is shown since, as will be described below, each of its eight stages is identical. The output terminal of each corresponding binary in eight-bit store 200 and binary counter 210 are connected to a summing amplifier 401 such as shown on page 252 of "Electron Tube Circuits" by Samuel Seely, published by McGraw-Hill Book Company, 1958 in a stage 400 of the comparator. Each binary produces a positive output voltage when it is in the "set" condition and a negative output voltage when it is in the "reset" condition. The result is that when corresponding binaries are "set" and each is producing a positive voltage at its output terminal the output signal at the output of summing amplifier 401 to which their outputs are connected is a voltage equal to twice the voltage generated by each binary. When the binaries are each reset the voltage at the output terminal of summing amplifier 401 in the stage to which the binaries are connected is a negative voltage equal to twice the negative voltage at each output terminal of each binary. Finally, when corresponding binary circuits are in opposite conditions, that is, one is set while the other is reset no voltage appears at the output of the summing amplifier.

The output of summing amplifier 401 in each stage 400 is connected to the input terminal of a pair of regenerative comparators 402 and 403. Regenerative comparators 402 and 403 each may be the comparator described on page 468 of "Pulse and Digital Circuits" by Millman and Taub, published by McGraw-Hill Book Company, 1956. Regenerative comparator 402 generates a positive going pulse when the output of summing amplifier 401 is a positive voltage while regenerative pulse comparator 403 generates a positive voltage when the output of summing amplifier 401 is a negative voltage. The output signals from comparators 402 and 403 are each applied to an OR gate 404 whose output terminal is connected to one input terminal of an eight input terminal AND gate 405. As a result when the states of corresponding binaries in counter 210 and store 200 are in the same state either regenerative comparator 402 or 403 in each stage generates an output voltage which is applied to one input terminal of AND gate 405.

Each of the binary circuits in store 200 and counter 210 are similarly connected to a stage 400 comprising a summing amplifier and a pair of regenerative comparators whose outputs are connected to an OR gate in the same manner as shown in FIG. 6 for the binaries $B_0$. Thus when corresponding binaries in counter 210 and store 200 are all in the same state AND gate 405 is enabled and produces the output signal which enables transmission gates 184 through 190 and provides a signal to clear binary counter 210.

A third embodiment of this invention is shown in FIGS.

Figure 7:
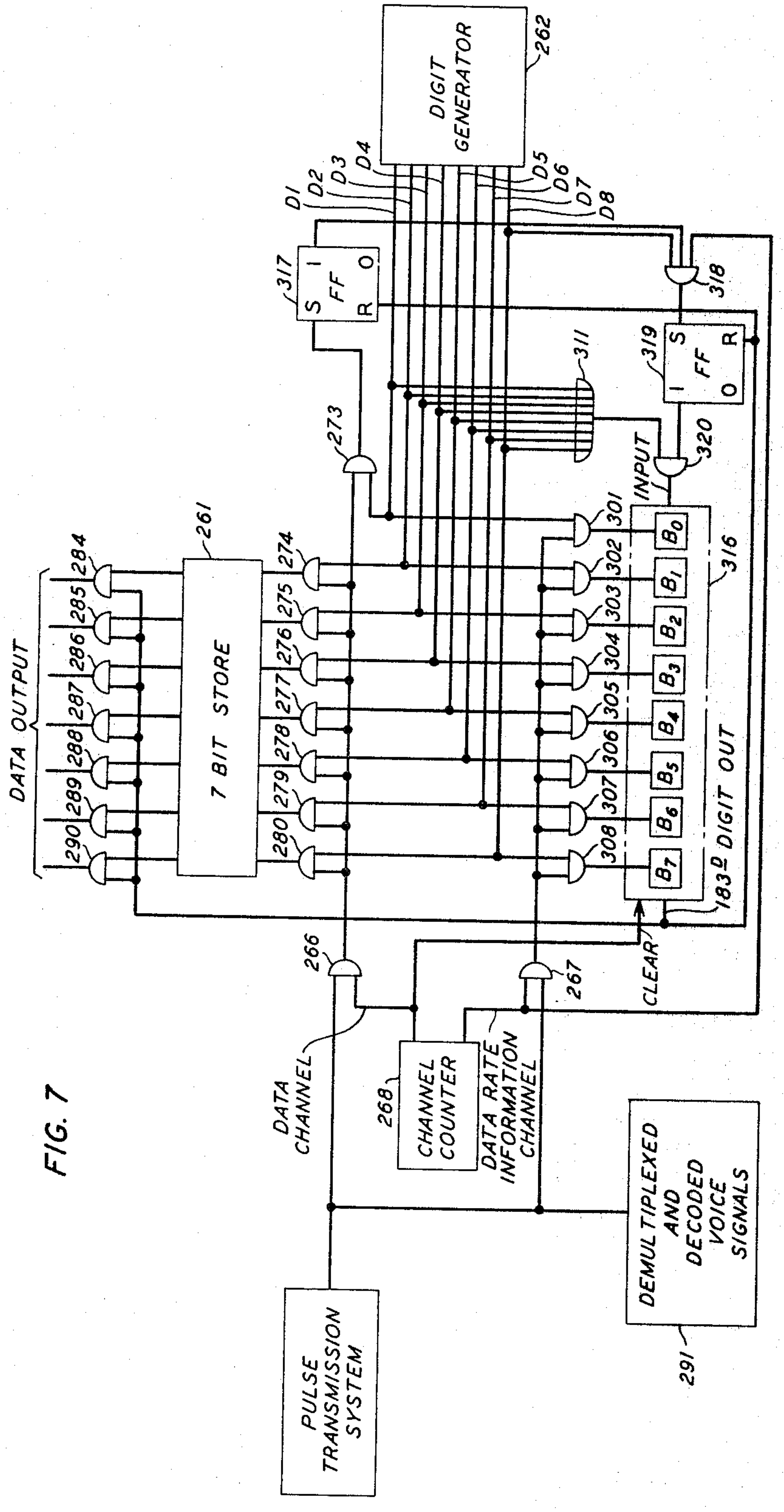
FIG. 7 is a block diagram of the receiving terminal of still another embodiment of this invention.

3A, 3B and 7 when they are placed side by side with FIG. 3A on the left, 3B in the middle, and FIG. 7 on the right. The transmitting terminal of this embodiment of the invention is described in detail above. At the receiver each transmitted data character is stored in seven-bit store 261 under the control of channel counter 268, transmission gate 266, digit generator 262, transmission gates 274 through 280 in exactly the same manner as data is stored in store 161 in FIG. 3C. Apparatus in FIG. 7 which corresponds to that in FIGS. 3B and 3C has a reference numeral which is one hundred numbers higher. Transmission gates 301 through 308, respectively, operate in the same manner as transmission gates 201 through 208 to transmit to their output terminals marks and spaces representative of the outputs of binaries $B_0$ through $B_7$ in counter 135. These output signals are used to preset, in the manner taught by Millman and Taub on page 332 of their above-mentioned text, binaries $B_0$ through $B_7$ of a binary counter 316 so that the binary counter starts counting digit pulses at the number recorded by counter 135.

The counting commences upon the occurrence of the eighth time slot of the data rate information channel of a frame in which a data character has been transmitted. Transmission gate 273 transmits the mark in the first time slot of a data channel containing a data character which sets bistable circuit 317 whose 1 output terminal is connected to one input terminal of three input terminal AND gate 318. The other two input terminals of AND gate 318 are connected to receive the $D_8$ digit pulse from generator 262 and the data rate information channel output pulse from counter 268. Thus AND gate 318 generates an output pulse at the end of the data rate information channel which sets a bistable circuit 319 whose 1 output terminal is connected to enable transmission gate 320. The transmission gate 320 is in turn connected to each output terminal of digit generator 252 by OR gate 321 so that binary counter 316 commences to count digit pulses immediately after the eighth time slot of the data rate information channel. Upon the occurrence of the number 183 the counter generates an output pulse in the manner taught by T. H. Thomason in "A Preset Counter for Time and Quantity Measurements," Teletech and Electronic Industries, page 82, August 1953, which enables AND gates 284 through 290 to read out the data stored in store 251 and, in addition, resets bistable circuits 317 and 319 in order to prepare for the readout of the next data character. Binary counter 316 is cleared by the next occurring pulse at the data channel output terminal of channel counter 268.

Since binary counter 316 starts counting at the number recorded by counter 133 and generates an output pulse at count 183 to read out the data character from store 261 a total time of 125 microseconds elapses from storage of data at the receiving terminal to readout since 10 microseconds elapses between the first time slot of the data channel and the last time slot of the data rate information channel which immediately follows the data channel. Thus in accordance with this invention each data character will be readout at the receiving terminal a number of time slots before the next occurring data channel which corresponds to the delay between storage and transmission at the transmitter.

Thus in accordance with this invention data is transmitted in a predetermined channel of the pulse transmission system and information regarding the instantaneous data rate is transmitted in a second channel. All the other channels may be utilized for the transmission of voice signals. Or, data, from the same or other sources, may be transmitted by duplicating the above-described equipment. Up to twelve channels of data may be transmitted over the pulse transmission system, or as little as one channel may be utilized for data transmission with twenty-two channels utilized for voice transmission.

It is to be understood that the above-described arrangements are illustrative of the application of the principles of the invention. Numerous other arrangements may be devised by those skilled in the art without departing from the spirit and scope of the invention.

What is claimed is:

1. Apparatus for transmitting data from a data source over a predetermined channel of a multiple channel regenerative pulse code modulation transmission system, comprising, in combination, a source of data characters, means at the transmitting terminal of said transmission system to store each of said data characters, means at said transmitting terminal to transmit each of said stored data characters in said predetermined channel, and means at said transmitting terminal to measure the time interval between storage of each said data character and the occurrence of the next predetermined channel in which it is transmitted, means at said transmitting terminal to transmit in a second predetermined channel information regarding each said time interval measured, and means at the receiving terminal of said transmission system responsive to each received data character and said information transmitted in said second predetermined channel to completely reconstruct the data characters and the rates at which they occurred at said data source.

2. Apparatus for transmitting data from a data source over a predetermined channel of a multiple channel regenerative pulse code modulation transmission system, comprising, in combination, a source of data characters, means at the transmitting terminal of said transmission system to store each of said data characters, means at said transmitting terminal to transmit each of said stored data characters in said predetermined channel, a voltage time base generator at said transmitting terminal which generates a voltage which rises linearly with time upon the storage of each said data character and which is turned off upon the transmission of each said data character, means at said transmitting terminal to measure the peak voltages attained by said generator, encoding means at said transmitting terminal to encode said peak voltages, means to transmit in a second predetermined channel the encoded peak voltage signal representing the period of storage of each said data character, means at the receiving terminal of said transmission system to store each received data character, decoding means at said receiving terminal to decode said encoded peak voltage signal transmitted in said second predetermined channel to produce an analog voltage representative thereof, a voltage time base generator at said receiving terminal to generate upon the reception of a data channel a voltage which varies linearly with time and which has a slope which is the negative of the slope of the voltage generated by said voltage time base generator at said transmitting terminal, and means at said receiving terminal to read each data character out of said store when said voltage time base generator at said receiving terminal produces an output voltage equal to the analog voltage output of said decoder.

3. Apparatus for transmitting data from a data source over a predetermined channel of a multiple channel regenerative pulse code modulation transmission system having a frame comprising $f$ time slots, comprising a source of data characters, means at the transmitting terminal of said transmission system to store each of said data characters, means at said transmitting terminal to transmit each said stored data character in said predetermined channel, a digit pulse generator at said transmitting terminal which generates a pulse during each time slot of each channel of the transmission system, a counter at said transmitting terminal to count the pulses generated by said digit pulse generator during the interval of time between the storage of each data character and its transmission, means to transmit digital information representing the number of digit pulses counted by said counter to the receiving terminal of said transmission system over a second predetermined channel of said transmission system, counting means at said receiving terminal to count backwards from a number $f$, equal to the number of time slots in a frame, upon the reception of a data character, means at said receiving terminal to store said digital information representing the number of digit pulses counted by said counter at said transmitting terminal and transmitted in said second predetermined channel, a data store at said receiving terminal to store said received data characters, and means at said receiving terminal to read each data character out of said data store when said counter at said receiving terminal produces a count equal to the count stored in said store which count represents the delay between storage and transmission of a data character at the transmitting terminal.

4. Apparatus for transmitting data from a data source over a predetermined channel of a multiple channel regenerative pulse code modulation transmission system having a frame comprising $f$ time slots, comprising, in combination, a source of data characters, means at the transmitting terminal of said transmission system to store each of said data characters, means at the transmitting terminal to transmit each said stored data character over said predetermined channel, a digit pulse generator at said transmitting terminal which generates a pulse during each time slot of said frame of $f$ time slots, a counter at said transmitting terminal to count the pulses generated by said digit pulse generator during the interval of time between the storage of each data character and its transmission, means to transmit an eight-digit binary number in a second predetermined channel of said transmission system said eight-digit binary number representing each count of said counter, a data store at said receiving terminal to store each received data character, a binary counter at the receiving terminal, means at said receiving terminal to preset said binary counter to the number transmitted in said second predetermined channel, a digit pulse generator at the receiving terminal, means at said receiving terminal connecting said digit pulse generator to said binary counter, and means at said receiving terminal to read each data character out of said data store when said counter at said receiving terminal produces a count equal to $f$ minus $x$ where $x$ is the number of time slots between the reception of the predetermined channel in which data characters are transmitted and the reception of said second predetermined channel.

References Cited

UNITED STATES PATENTS

| | | | |
|---|---|---|---|
| 2,907,829 | 10/1959 | Carbrey | 179—15 |
| 3,178,511 | 4/1965 | Kern | 178—70 X |
| 3,261,986 | 7/1966 | Kawashima et al. | 178—70 X |

JOHN W. CALDWELL, *Acting Primary Examiner.*

W. S. FROMMER, *Assistant Examiner.*